US008725562B2

(12) United States Patent
Song et al.

(10) Patent No.: US 8,725,562 B2
(45) Date of Patent: May 13, 2014

(54) KEYWORD ADVERTISEMENT USING RANKING OF ADVERTISERS

(75) Inventors: Ki Ho Song, Seoul (KR); Minuk Kim, Seoul (KR); Byounghak Kim, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 1194 days.

(21) Appl. No.: 12/058,640

(22) Filed: Mar. 28, 2008

(65) Prior Publication Data

US 2008/0243617 A1     Oct. 2, 2008

(30) Foreign Application Priority Data

Mar. 30, 2007   (KR) ........................ 10-2007-0031533

(51) Int. Cl.
*G06Q 30/00* (2012.01)
*G06Q 30/02* (2012.01)

(52) U.S. Cl.
CPC ........ *G06Q 30/0224* (2013.01); *G06Q 30/0231* (2013.01); *G06Q 30/0256* (2013.01); *G06Q 30/0277* (2013.01)
USPC ................... 705/14.25; 705/14.31; 705/14.54

(58) Field of Classification Search
CPC .......... G06Q 30/0224; G06Q 30/0231; G06Q 30/0256; G06Q 30/0277
USPC ................................ 705/14.25, 14.31, 14.54
See application file for complete search history.

(56) References Cited

U.S. PATENT DOCUMENTS

| 2002/0038241 | A1* | 3/2002 | Hiraga ............................ 705/14 |
| 2004/0044571 | A1  | 3/2004 | Bronnimann et al. |
| 2004/0133471 | A1* | 7/2004 | Pisaris-Henderson et al. . 705/14 |
| 2004/0267806 | A1  | 12/2004 | Lester |
| 2007/0226060 | A1* | 9/2007 | Do ................................. 705/14 |
| 2008/0109438 | A1* | 5/2008 | Hengel ............................ 707/7 |
| 2008/0140502 | A1* | 6/2008 | Birnholz et al. ................ 705/10 |

FOREIGN PATENT DOCUMENTS

| JP | 2005-537591   | 12/2005 |
| JP | 2006-516767   | 7/2006  |
| KR | 10-2002-0039791 | 5/2002 |
| KR | 2002-74828    | 10/2002 |
| KR | 2005-23242    | 3/2005  |
| WO | 2004/021152   | 3/2004  |
| WO | 2005/006282   | 1/2005  |
| WO | 2006/094180   | 9/2006  |

* cited by examiner

*Primary Examiner* — Thomas M Hammond, III
*Assistant Examiner* — John Scarito
(74) *Attorney, Agent, or Firm* — Harness, Dickey & Pierce

(57) ABSTRACT

A method of providing a keyword advertisement and a system for executing the method are provided. The method of providing the keyword advertisement includes: generating and maintaining an advertiser history ranking by using an advertiser keyword purchase history; and ordering the keyword advertisement display with respect to a user keyword by using the advertiser history ranking. In this instance, the advertiser keyword purchase history includes mapping information between an advertiser and a keyword purchased by the advertiser for each advertisement group or for each advertisement campaign.

18 Claims, 6 Drawing Sheets

KEYWORD ADVERTISEMENT USING RANKING OF ADVERTISERS

CROSS-REFERENCE TO RELATED APPLICATION

This application claims the benefit of Korean Patent Application No. 10-2007-0031533, filed on Mar. 30, 2007, in the Korean Intellectual Property Office, the disclosure of which is incorporated herein by reference.

BACKGROUND

1. Field

The present disclosure relates to a method of providing a keyword advertisement and a system for executing the method, and more particularly, to a method and system of providing an advertiser, purchasing a large number of association keywords for each advertisement group or for each advertisement campaign, with benefits of priority in display order of the advertisement and discounted rates for advertising services.

2. Discussion of the Related Technology

Keyword advertisement is a form of advertisement exclusively displayed in a search result page when a user performs a search using a search string containing a keyword which an advertiser has purchased. Since the keyword advertisement tends to show advertisement contents to only the people having interest in a specific product or a specific item, the keyword advertisement tends to be a more effective means of advertising and may increase the click rate of the advertisement.

FIG. 1 illustrates a method of providing a keyword advertisement according to a conventional art.

A search engine 101 extracts a search result from a database 104 using a search word received by a search page 103 from a user terminal 102, generates a search result page 105 with respect to the search result, and provides the user terminal 102 with the search result page 105. Specifically, the search engine 101 extracts a keyword from the search word, and verifies whether the keyword advertisement with respect to the keyword exists. When the keyword advertisement with respect to the keyword exists, the search engine 101 provides the search result page 105 with the keyword advertisement. Accordingly, an advertisement for a portion in which a user of the user terminal 102 is interested may be provided. In this instance, the display order of the keyword advertisement is generally determined when the keyword advertisement is purchased.

However, as described above, since the exposure order of the keyword advertisement is simply determined for each random keyword when the keyword is purchased, a method of providing the advertiser purchasing the large number of keywords with specific benefits does not exist.

SUMMARY

One aspect of the invention provides a method of running a keyword advertisement service, the method comprising: providing a database comprising a plurality of keywords and a plurality of advertisers, who have purchased one or more of the plurality of keywords for the keyword advertisement, wherein the database identifies one or more of the keywords purchased by each advertiser; counting the number of keywords purchased by each advertiser; ranking at least part of the plurality of advertisers based on the number of keywords purchased by the advertisers, thereby generating a rank of each of the at least part of the plurality of advertisers; and using the ranks of the plurality of advertisers for further processing.

In the foregoing method, the plurality of keywords may be sold to advertisers for the keyword advertisement, wherein each keyword sold to an advertiser is associated with an advertisement or a keyword-linked page designated by the advertiser, wherein the keyword advertisement is performed such that, in response to a search using a first one of the plurality of keywords, at least one first advertisement associated with the first keyword is displayed; at least one first keyword-linked page associated with the first keyword is anchor-tagged on a search result page for clicking through to the keyword-linked page; or the at least one first keyword-linked page is opened on a user's terminal.

The method may further comprise: receiving a search query using a first one of the plurality of keywords; conducting a search using the search query to obtain a search result; formulating a search result page comprising the search result and a plurality of anchor-tags for opening anchor-tagged pages associated with the first keyword, wherein the ranks are used to determine an order of the plurality of anchor-tags appearing on the search result page; and transmitting the search result page to a user's terminal.

The method may further comprise: receiving a request for subscribing the keyword advertisement from a first one of the plurality of advertisers; and using a rank of the first advertiser in formulating terms of a keyword advertisement contract with the first advertiser. Formulating may further comprise determining whether to apply a discounted rate for the keyword advertisement contract with the first advertiser.

The database in the method may further identify a plurality of categories for at least part of the plurality of keywords such that a subgroup of the plurality of keywords belong to one of the plurality of categories, wherein computing the number of keyword purchased by each advertiser is performed for the keywords of the subgroup, and wherein ranking is performed within the subgroup so as to generate the rank among the advertisers who have purchased one or more keywords of the subgroup.

In the foregoing method ranking may be performed with respect to all of the plurality of advertisers, who have purchased one or more of the plurality of keywords that are subject to the keyword advertisement service. The ranking may be based on the number of keywords that are presently subject to the keyword advertisement service. The ranking may further comprise sorting the at least part of the plurality of advertisers further based on the purchase date of the one or more advertisement keywords.

Using the ranks may comprise publishing the ranks so that the plurality of advertisers can access the ranks, wherein publishing may further publish at least one incentive for higher ranked advertisers along with the ranks.

Another aspect of the invention provides a method of running a keyword advertisement service, the method comprising: providing a database comprising a plurality of keywords and a plurality of advertisers, who have purchased one or more of the plurality of keywords for the keyword advertisement, wherein the database identifies one or more of the keywords purchased by each advertiser providing a weight assigned to each of at least part of the plurality of keywords; performing a mathematical operation using weights of one or more keywords purchased by each advertiser so as to generate an index for each advertiser; ranking the indexes of the at least part of the plurality of advertisers, thereby generating a rank for each of the at least part of the plurality of advertisers; and using the ranks of the plurality of advertisers for further processing. The mathematical operation may comprise at least one of summing the weights of the one or more keywords purchased by each advertiser and multiplying the weights of the one or more keywords purchased by each advertiser.

In the foregoing method, the plurality of keywords may be sold to advertisers for the keyword advertisement, wherein each keyword sold to an advertiser is associated with an advertisement or a keyword-linked page designated by the advertiser, wherein the keyword advertisement is performed such that, in response to a search using a first one of the plurality of keywords, at least one first advertisement associated with the first keyword is displayed; at least one first keyword-linked page associated with the first keyword is anchor-tagged on a search result page for clicking through to the keyword-linked page; or the at least one first keyword-linked page is opened on a user's terminal.

The method may further comprise: receiving a search query using a first one of the plurality of keywords; conducting a search using the search query to obtain a search result; formulating a search result page comprising the search result and a plurality of anchor-tags for opening anchor-tagged pages associated with the first keyword, wherein the ranks are used to determine an order of the plurality of anchor-tags appearing on the search result page; and transmitting the search result page to a user's terminal.

The method may further comprise: receiving a request for subscribing the keyword advertisement from a first one of the plurality of advertisers; and using a rank of the first advertiser in formulating terms of a keyword advertisement contract with the first advertiser. The formulating may comprise determining whether to apply a discounted rate for the keyword advertisement contract with the first advertiser.

The database in the foregoing method may further identify a plurality of categories for at least part of the plurality of keywords such that a subgroup of the plurality of keywords belong to one of the plurality of categories, wherein computing the weight of keyword purchased by each advertiser is performed for the keywords of the subgroup, and wherein ranking is performed within the subgroup so as to generate the rank among the advertisers who have purchased one or more keywords of the subgroup.

In the method, ranking may be performed with respect to all of the plurality of advertisers, who have purchased one or more of the plurality of keywords that are subject to the keyword advertisement service. The ranking may be based on the number of keywords that are presently subject to the keyword advertisement service. The ranking may further comprise sorting the at least part of the plurality of advertisers further based on the purchase date of the one or more advertisement keywords.

In the foregoing, method using the ranks may comprise publishing the ranks so that the plurality of advertisers can access the ranks, wherein publishing may further publish at least one incentive for higher ranked advertisers along with the ranks.

Yet another aspect of the invention provides a system for running a keyword advertisement service, the system comprising: a database comprising a plurality of keywords and a plurality of advertisers, who have purchased one or more of the plurality of keywords for the keyword advertisement, wherein the database identifies one or more of the keywords purchased by each advertiser; means for computing the number of keywords purchased by each advertiser; means for ranking at least part of the plurality of advertisers based on the number of keywords purchased the advertisers, thereby generating a rank of each of the at least part of the plurality of advertisers; and means for using the ranks of the plurality of advertisers for further processing.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
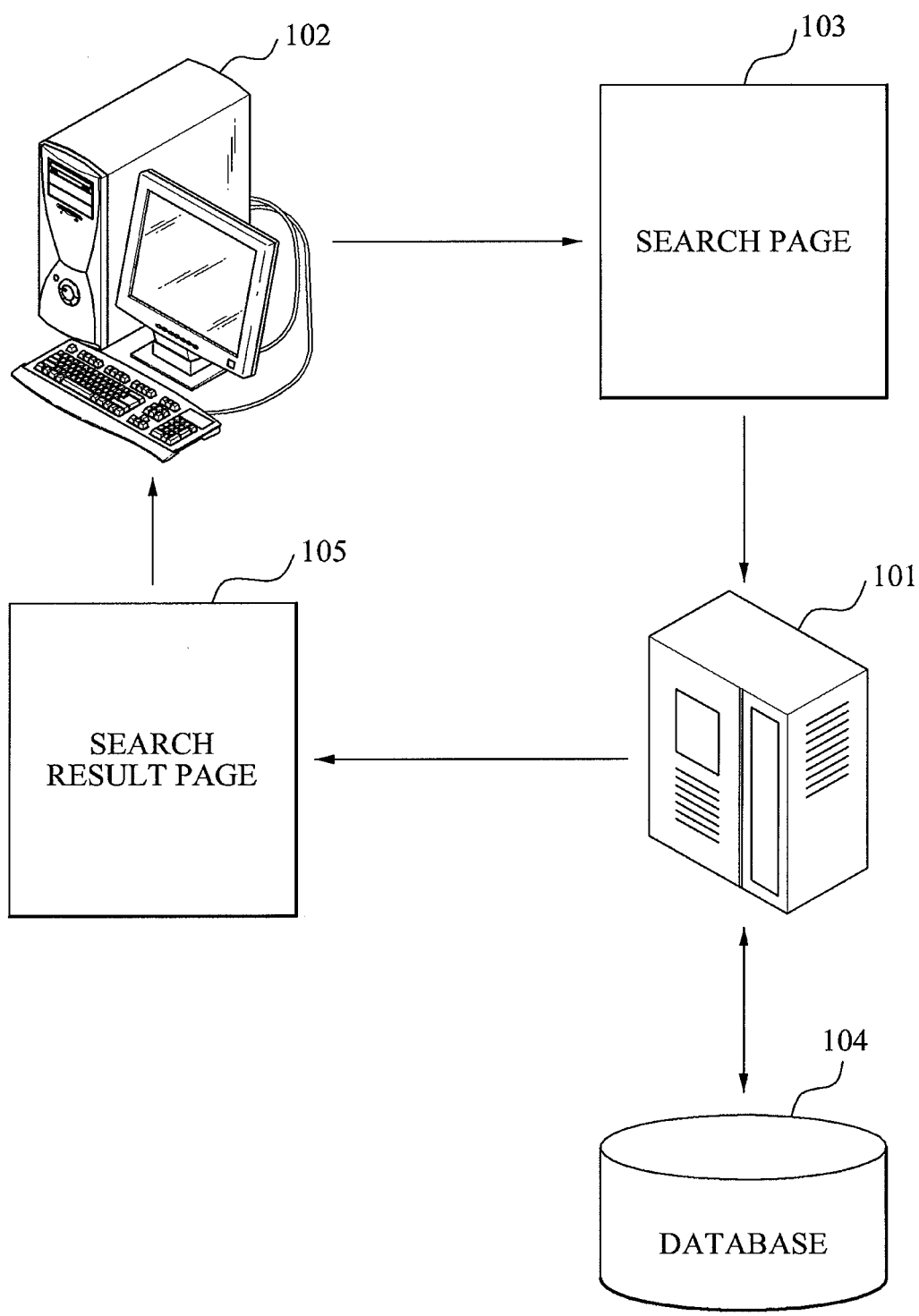
FIG. 1 illustrates a method of providing a keyword advertisement according to a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
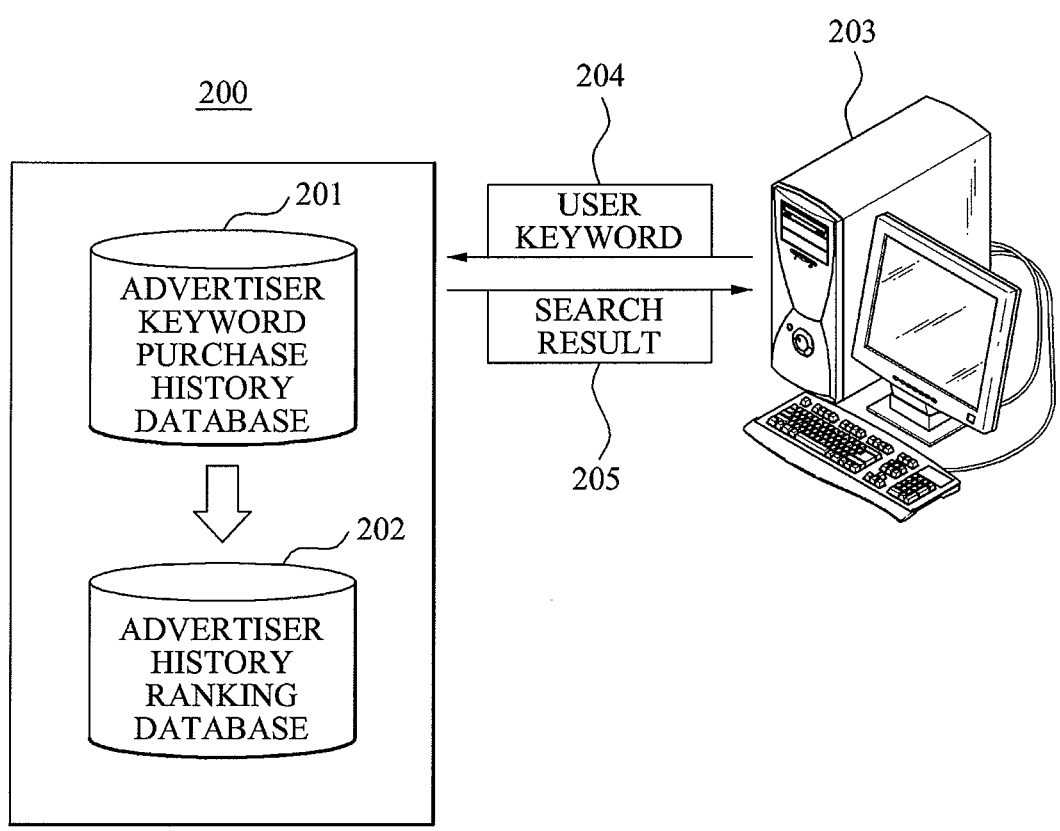
FIG. 2 illustrates an overview of a system for providing a keyword advertisement according to an embodiment of the present invention.

FIG. 2 illustrates an overview of a system 200 for providing a keyword advertisement according to an exemplary embodiment of the present invention.

The system 200 for providing the keyword advertisement may include an advertiser keyword purchase history database 201 configured to store and maintain an advertiser keyword purchase history including mapping information between an advertiser and a keyword purchased by the advertiser. In this instance, the system 200 for providing the keyword advertisement may generate an advertiser history ranking for each advertisement group or for each advertisement campaign by using the advertiser keyword purchase history, and storing the advertiser history ranking in an advertiser history ranking database 202.

The system 200 for providing the keyword advertisement subsequently receives a user keyword 204 from a user terminal 203, generates a search result 205 for the user keyword 204, and transmits the search result 205 to the user terminal 203. Here, the system 200 for providing the keyword advertisement may provide the search result 205 including the keyword advertisement corresponding to the user keyword 204, and use the advertiser history ranking for ordering the keyword advertisement.

Specifically, the system 200 for providing the keyword advertisement identifies and orders the keyword advertisement with respect to the user keyword 204 using data stored by the advertiser history ranking database 202, and transmits the search result 205 including the keyword advertisement to the user terminal 203.

Figure 3:
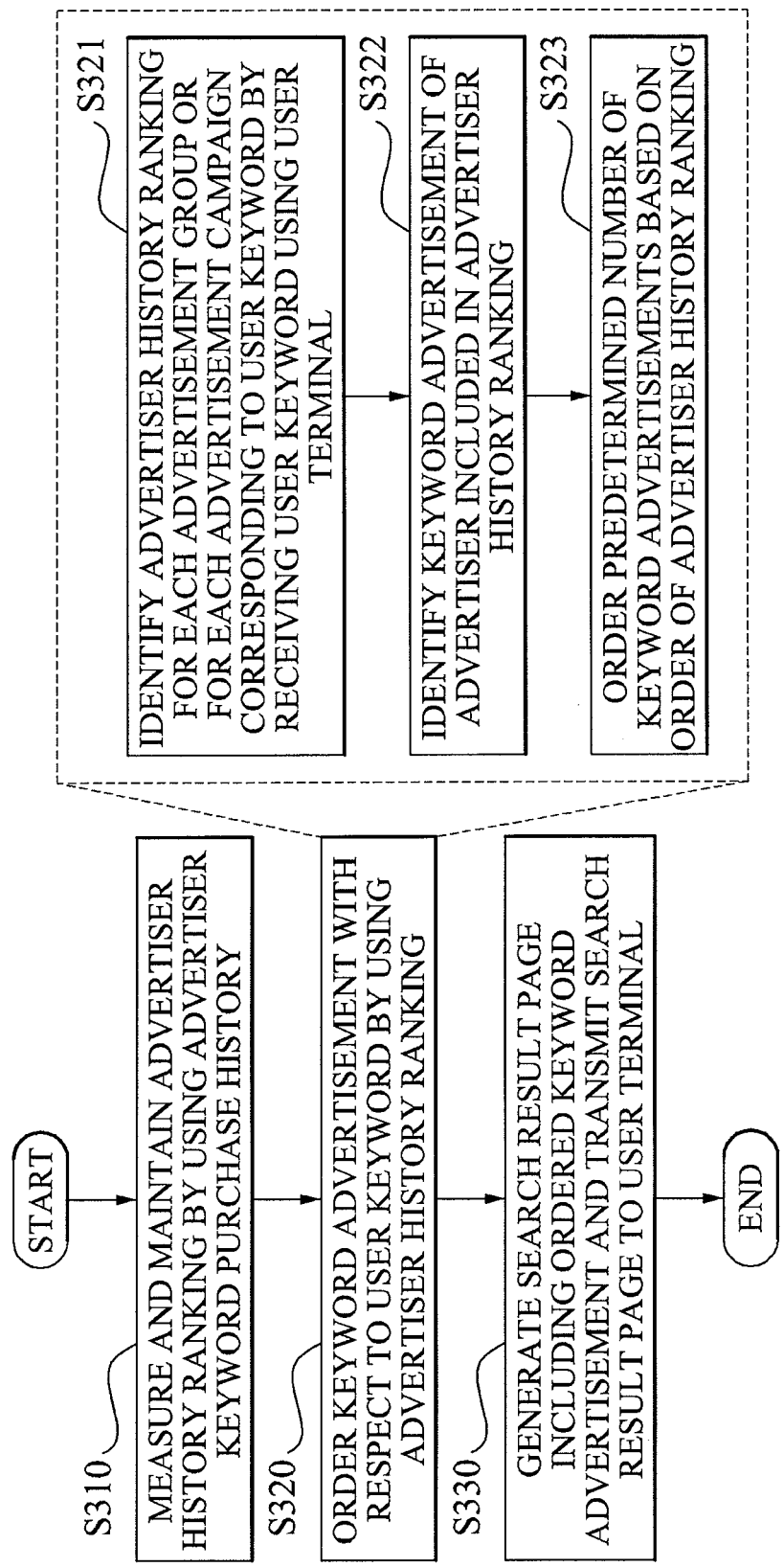
FIG. 3 is a flowchart illustrating a method of providing a keyword advertisement according to an exemplary embodiment of the present invention.

FIG. 3 is a flowchart illustrating a method of providing a keyword advertisement according to an exemplary embodiment of the present invention.

In operation S310, a system for providing the keyword advertisement measures and maintains an advertiser history ranking by using an advertiser keyword purchase history. In this instance, the advertiser keyword purchase history includes mapping information between an advertiser and a keyword purchased by the advertiser for each advertisement group or for each advertisement campaign.

Specifically, the system for providing the keyword advertisement may store the mapping information by mapping the advertiser and the keyword each time the keyword is sold or registered, and the mapping information may be stored and maintained in the advertiser keyword purchase history database as described with reference to FIG. 2. A method of generating the advertiser history ranking using the above-described advertiser keyword purchase history is described in detail with reference to FIG. 4 and FIG. 5.

In operation S320, the system for providing the keyword advertisement orders the keyword advertisement with respect to a user query, including one or more keywords, by using the advertiser history ranking. Here, for ordering the keyword advertisement as illustrated in FIG. 3, the system for providing the keyword advertisement may include operation S321 of identifying the advertiser history ranking for each advertisement group or for each advertisement campaign corresponding to the user keyword by receiving the user keyword using the user terminal, operation S322 of identifying a keyword advertisement of an advertiser included in the advertiser history ranking, and operation S323 of ordering a predetermined number of keyword advertisements based on the rank of the advertiser history ranking.

In this instance, the system for providing the keyword advertisement may be adjusted so that the keyword advertisement may be affected by the advertiser history ranking only for a keyword group of an identical classification. Specifically, when the advertiser holding a high rank in the advertiser history ranking registers only the keyword unassociated with the user keyword, the keyword advertisement of the advertiser may be excluded to be unaffected in ordering of the keyword advertisement.

For example, when advertiser 'A' registers a keyword corresponding to various keyword groups including clothes, electronic devices, and the like, and the user keyword is the keyword corresponding to the clothes, the keyword advertisement corresponding to the clothes from among keyword advertisements of advertiser 'A' is affected by the advertiser history ranking, however, the keyword advertisement corresponding to the electronic devices may be excluded from operation S320 of ordering the keyword advertisement to be unaffected by the advertiser history ranking.

In operation S330, the system for providing the keyword advertisement generates a search result page including the ordered keyword advertisements and transmits the search result page to a user terminal. Specifically, the system for providing the keyword advertisement generates the search result page and transmits the search result page to the user terminal so that the keyword advertisement of the advertiser holding the high rank in the advertiser history ranking may be displayed in the high rank of the search result page.

Figure 4:
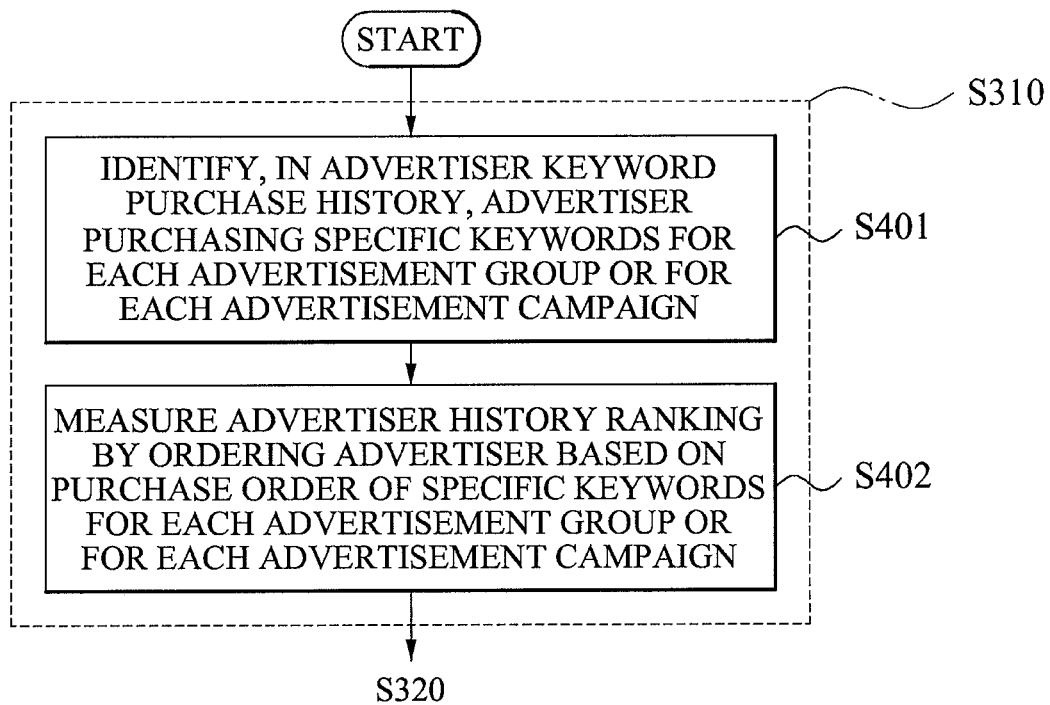
FIG. 4 illustrates an example for describing a method of measuring an advertiser history ranking according to an exemplary embodiment of the present invention.

FIG. 4 illustrates an example for describing a method of generating an advertiser history ranking according to an exemplary embodiment of the present invention. Here, operation S401 and operation S402 may be included in operation S310 described with reference to FIG. 3 as the example of the method of generating the advertiser history ranking.

In operation S401, the system for providing the keyword advertisement identifies, in the advertiser keyword purchase history, an advertiser purchasing specific keywords for each advertisement group or for each advertisement campaign. Here, the specific keywords satisfy a predetermined condition from among a first condition of having a keyword association degree being greater than or equal to a predetermined keyword association degree, a second condition of being greater than or equal to a predetermined number of queries and clicks of the keyword-linked page linked with anchor tags on the sear result page, a third condition of existing in the order of keyword advertisements currently able to display on the search result page, and a fourth condition of being sold to the advertiser at a price higher than or equal to a predetermined price.

Specifically, the system for providing the keyword advertisement may identify the advertiser purchasing the keyword satisfying the predetermined condition from among the first condition through the fourth condition for each advertisement group or for each advertisement campaign. The conditions may be identical or different for each advertisement group or for each advertisement campaign.

Also, the system for providing the keyword advertisement may identify the advertiser purchasing the keyword satisfying all of a plurality of conditions from among the conditions or each of the plurality of conditions for each one advertisement group or for each one advertisement campaign.

Here, the keyword association degree includes at least one keyword association degree of a first keyword association degree calculated based on a plurality of documents, a second keyword association degree calculated based on a query log, and a third keyword association degree calculated by a predetermined calculation between the first keyword association degree and the second keyword association degree.

In this instance, the first keyword association degree is calculated by a statistical correlation degree based on a frequency number of keyword cross appearances in the plurality of documents, and the second keyword association degree is calculated by a statistical similarity degree based on a frequency number of cross appearances of a query keyword for each session in a search engine user query log.

For example, the first keyword association degree is calculated in accordance with Equation 1, and the second keyword association degree is calculated in accordance with Equation 2:

$$sim_{Dice}(t_1, t_2) = \frac{\sum_{f_{i1}>0 \wedge f_{i2}>0}(f_{i1}+f_{i2})}{\sum_i f_{i1} + \sum_i f_{i2}}, \quad \text{[Equation 1]}$$

where simDice denotes a first keyword association degree, t1 and t2 denote two keywords for measuring the first keyword association degree, and fi1 and fi2 respectively denote a frequency number of cross appearances of the two keywords in an i-th document of a plurality of documents;

$$sim_{pmi}(t_1, t_2) = \log_2 \frac{p(t_1, t_2)}{p(t_1) \cdot p(t_2)}, \quad \text{[Equation 2]}$$

where $sim_{pmi}$ denotes a second keyword association degree, $t_1$ and $t_2$ denote two keywords for measuring the second keyword association degree, and p( ) denotes a pointwise mutual information formula.

Also, the third keyword association degree may be calculated using a sum of the first keyword association degree and the second keyword association degree. Specifically, since the first keyword association degree is calculated based on the plurality of documents, a frequency of a common noun is relatively high and holds a high rank in the similarity degree, and since the second keyword association degree is calculated based on the search engine query log, a frequency of a compound noun is relatively high. Accordingly, the third keyword association degree may be used for using an average value of the first keyword association degree and the second keyword association degree.

As described above, the system for providing the keyword advertisement may generate the advertiser history ranking, a history ranking of the advertisers using the keyword association degrees. Also, the system for providing the keyword advertisement may generate the advertiser history ranking with respect to the advertisers registering a large number of keywords contributing to sales, such as a keyword having a number of queries and clicks greater than or equal to a predetermined number of queries and clicks, a keyword being currently exposable, and a keyword being sold at a price higher than or equal to a predetermined price.

In operation S402, the system for providing the keyword advertisement generates the advertiser history ranking by ordering the advertiser based on a purchase order of the specific keywords for each advertisement group or for each advertisement campaign. Specifically, since the system for providing the keyword advertisement generates the advertiser history ranking by ordering the advertiser based on the purchase order of the specific keywords, the advertiser contributing to a large number of sales using the keyword may hold a high rank in the advertiser history ranking, and may be provided with benefits of high priority in display order or discounted rates by using the advertiser history ranking.

Figure 5:
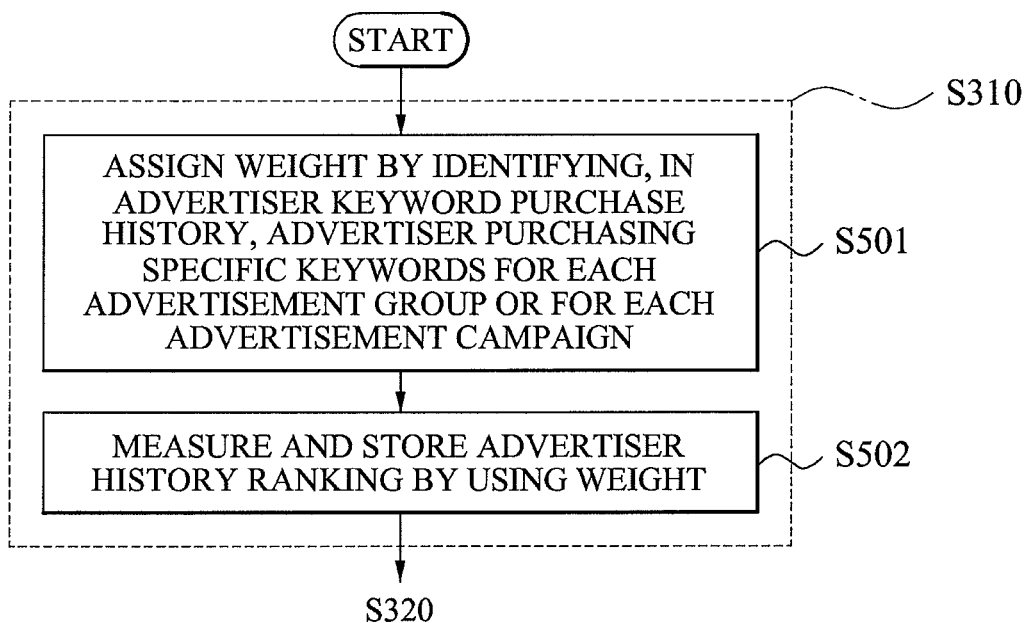
FIG. 5 illustrates another example for describing a method of measuring or generating an advertiser history ranking according to an exemplary embodiment of the present invention.

FIG. 5 illustrates another example for describing a method of generating an advertiser history ranking according to an exemplary embodiment of the present invention. Here, operation S501 and operation S502 may be included in operation S310 described with reference to FIG. 3 as another example of the method of generating the advertiser history ranking.

In operation S501, a system for providing a keyword advertisement assigns a weight by identifying, in the advertiser keyword purchase history, an advertiser purchasing specific keywords for each advertisement group or for each advertisement campaign. Here, as described with reference to FIG. 4, the specific keywords satisfy a predetermined condition from among a first condition of having a keyword association degree being greater than or equal to a predetermined keyword association degree, a second condition of being greater than or equal to a predetermined number of queries and clicks of the keyword-linked page linked with anchor tags on the sear result page, a third condition of existing in an order currently able to display, and a fourth condition of being sold to the advertiser at a price higher than or equal to a predetermined price.

In this instance, the system for providing the keyword advertisement assigns the weight established for each condition to the advertiser purchasing the keyword satisfying the predetermined condition. Specifically, the system for providing the keyword advertisement establishes the weight for each condition in advance, and assigns the established weight to the advertiser purchasing the specific keywords.

In operation S502, the system for providing the keyword advertisement measures and stores the advertiser history ranking by using the weight. Specifically, the system for providing the keyword advertisement may calculate an advertiser weight for each keyword by summing up weights for each advertiser, and generate the advertiser history ranking by ordering the advertiser by the advertiser weight. Similar to descriptions with reference to FIG. 4, since the advertiser contributing to sales holds a high rank in the advertiser history ranking, the advertiser may be provided with benefits of higher priority in display order or discounted rates.

As described above, the method of providing the keyword advertisement according to the present invention may induce a large number of registrations of the keyword advertisement and prevent abuse by providing an advertiser purchasing a large number of association keywords for each advertisement group or for each advertisement campaign with benefits of high priority in display order and discounted rates, providing an advertiser that registers a large number of keywords contributing to sales of media providing the keyword advertisement, such as a keyword having a number of queries and clicks greater than or equal to a predetermined number of queries and clicks and a keyword included in an order being currently displayable, with a large number of the benefits of the high priority in display order and discounted rates, or providing only the advertiser with the benefits.

Figure 6:
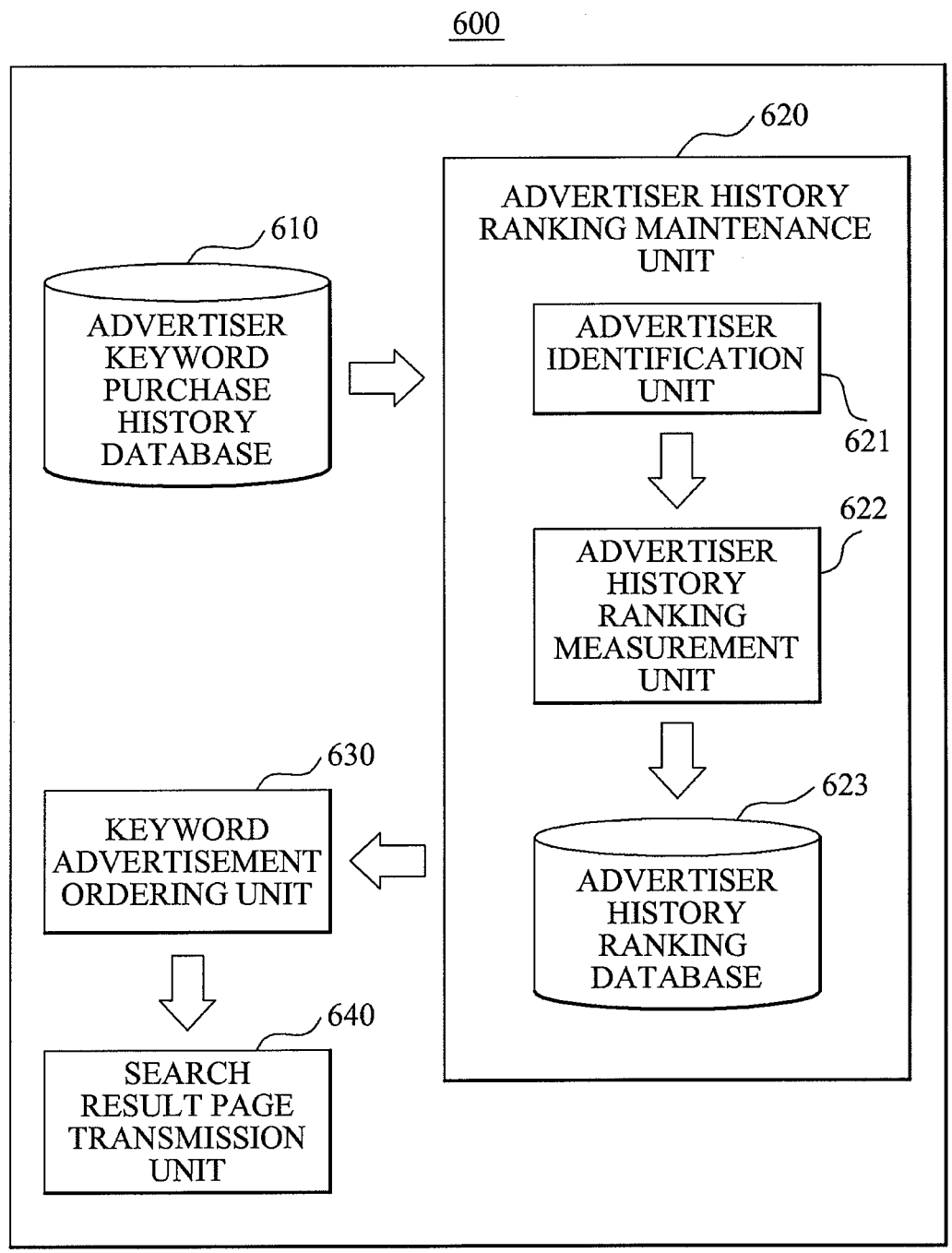
FIG. 6 is a block diagram illustrating an internal configuration of a system for providing a keyword advertisement according to another exemplary embodiment of the present invention.

FIG. 6 is a block diagram illustrating an internal configuration of a system 600 for providing a keyword advertisement according to another exemplary embodiment of the present invention. Here, as illustrated in FIG. 6, the system 600 for providing the keyword advertisement includes an advertiser keyword purchase history database 610, an advertiser history ranking maintenance unit 620, a keyword advertisement ordering unit 630, and a search result page transmission unit 640.

The advertiser keyword purchase history database 610 stores and maintains an advertiser keyword purchase history. In this instance, the advertiser keyword purchase history includes mapping information between an advertiser and a keyword purchased by the advertiser for each advertisement group or for each advertisement campaign. Specifically, the system 600 for providing the keyword advertisement may store the mapping information by mapping the advertiser and the keyword each time the keyword is sold or registered, and the mapping information may be stored and maintained in the advertiser keyword purchase history database 610.

The advertiser history ranking maintenance unit 620 measures and maintains an advertiser history ranking by using the advertiser keyword purchase history. In this instance, as illustrated in FIG. 6, in order to generate and maintain the advertiser history ranking, the advertiser history ranking maintenance unit 620 includes an advertiser identification unit 621 configured to identify, in the advertiser keyword purchase history, an advertiser purchasing specific keywords for each advertisement group or for each advertisement campaign, an advertiser history ranking measurement unit 622 configured to generate the advertiser history ranking by ordering the advertiser based on a purchase order of the specific keywords for each advertisement group or for each advertisement campaign, and an advertiser history ranking database 623 configured to store and maintain the advertiser history ranking.

Also, the advertiser history ranking maintenance unit 620 includes a weight assignment unit (not illustrated) configured to assign a weight by identifying, in the advertiser keyword purchase history, an advertiser purchasing specific keywords for each advertisement group or for each advertisement campaign, and an advertiser history ranking storage unit (not illustrated) configured to generate and store the advertiser history ranking by using the weight instead of the above-described advertiser identification unit 621, the advertiser history ranking measurement unit 622, and the advertiser history ranking database 623.

The keyword advertisement ordering unit 630 orders the keyword advertisement with respect to a user keyword by using the advertiser history ranking. Specifically, an advertisement of the advertiser holding a high rank in the advertiser history ranking, that is, the advertiser having a high contribution degree to sales, may be first ordered by ordering the keyword advertisement with respect to the user keyword using the advertiser history ranking. In this instance, the system 600 for providing the keyword advertisement may be adjusted so that the keyword advertisement may be affected by the advertiser history ranking only for a keyword group of an identical classification. Specifically, when the advertiser holding a high rank in the advertiser history ranking registers only the keyword unassociated with the user keyword, the keyword advertisement of the advertiser may be excluded to be unaffected in ordering of the keyword advertisement.

The search result page transmission unit 640 generates a search result page including the ordered keyword advertisement and transmits the search result page to a user terminal. Specifically, the search result page transmission unit 640 generates the search result page and transmits the search result page to the user terminal so that the keyword advertisement of the advertiser holding the high rank in the advertiser history ranking may be displayed in the high rank of the search result page.

As described above, the system for providing the keyword advertisement according to the present invention may induce a large number of registrations of the keyword advertisement and prevent abuse by providing an advertiser purchasing a large number of association keywords for each advertisement group or for each advertisement campaign with benefits of high priority in display order and discounted rates, providing an advertiser that registers a large number of keywords contributing to sales of media providing the keyword advertisement, such as a keyword having a number of queries and clicks greater than or equal to a predetermined number of queries and clicks and a keyword included in an order being currently displayable, with a large number of the benefits of the high priority in display order and discounted rates, or providing only the advertiser with the benefits.

The above-described exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, there is provided a method of providing a keyword advertisement and a system for executing the method which can induce a large number of registrations of the keyword advertisement by providing an advertiser purchasing a large number of association keywords for each advertisement group or for each advertisement campaign with benefits of high priority in display order and discounted rates.

Also, according to the present invention, there is provided a method of providing a keyword advertisement and a system for executing the method which can induce a large number of registrations of the keyword advertisement and prevent abuse by providing an advertiser that registers a large number of keywords contributing to sales of media providing the keyword advertisement, such as a keyword having a number of queries and clicks greater than or equal to a predetermined number of queries and clicks and a keyword included in an order being currently displayable, with a large number of benefits of high priority in display order and discounted rates, or providing only the advertiser with the benefits.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method that utilizes a processor to run a keyword advertisement service, the method comprising:
providing an advertiser keyword purchase history database that identifies one or more keywords purchased by an advertiser by mapping the advertiser to each purchased keyword each time a keyword is sold or registered, wherein each said purchased keyword is associated with a keyword advertisement or a keyword-linked page, and wherein said advertiser keyword purchase history database stores and maintains such mappings for a plurality of keywords and a plurality of advertisers;
calculating, using the advertiser keyword purchase history database, a number of keywords purchased by each advertiser of the plurality of advertisers;
generating, via a computer processor, an advertisement history ranking for at least part of the plurality of advertisers, by ranking each advertiser of the at least part of the plurality of advertisers in order based on the calculated number of keywords purchased by each advertiser of the at least part of the plurality of advertisers;
using the generated advertisement history ranking by,
receiving a search query using a first one of the plurality of keywords;
displaying, in a search result page, keyword advertisements designated by the advertisers of the at least part of the plurality of advertisers, in an order based on the generated advertisement history ranking, wherein the displayed keyword advertisements correspond to the first one of the plurality of keywords; and upon receiving a request for subscribing another keyword advertisement from a first advertiser of the at least part of the plurality of advertisers, formulating a keyword advertisement contract with said first advertiser based on the generated advertisement history ranking.

2. The method of claim 1, wherein using the generated advertisement history ranking further comprises:
obtaining a search result by conducting a search using the received search query;
formulating the search result page, wherein the search result page comprises the search result and the ordered keyword advertisements; and
transmitting the search result page to a user terminal that sent the search query.

3. The method of claim 1, wherein formulating the keyword advertisement contract comprises determining whether to apply a discounted rate for the keyword advertisement contract based on the first advertiser's rank in the generated advertisement history ranking.

4. The method of claim 1, wherein:
at least part of the plurality of keywords are associated with a plurality of categories; and
the method further includes,
identifying a subgroup of the at least part of the plurality of keywords that belong to one category of the plurality of categories; and wherein
the calculated number of keywords purchased by each advertiser is the number of keywords purchased in the subgroup, and
the ranking of each advertiser of the at least part of the plurality of advertisers is based on the number of keywords purchased in the subgroup.

5. The method of claim 1, wherein the at least part of the plurality of advertisers comprises all of the plurality of advertisers.

6. The method of claim 1, wherein the one or more keywords are purchased from a keyword advertisement service and the ranking of each advertiser of the at least part of the plurality of advertisers is further based on the number of keywords that are presently subject to the keyword advertisement service.

7. The method of claim 1, wherein the ranking of each advertiser of the at least part of the plurality of advertisers is further based on a purchase date of the keywords purchased by each advertiser of the at least part of the plurality of advertisers.

8. The method of claim 1, wherein using the generated advertisement history ranking further comprises:
publishing the generated advertisement history ranking, so that the plurality of advertisers can access the advertisement history ranking.

9. The method of claim 8, wherein the publishing further comprises publishing at least one incentive for higher ranked advertisers of the at least part of the plurality of advertisers.

10. A method that utilizes a processor to run a keyword advertisement service, the method comprising:
providing an advertiser keyword purchase history database that identifies one or more keywords purchased by an advertiser by mapping the advertiser to each purchased keyword each time a keyword is sold or registered, wherein each said purchased keyword is associated with a keyword advertisement or a keyword-linked page, and wherein said advertiser keyword purchase history database stores and maintains such mappings for a plurality of keywords and a plurality of advertisers;
calculating, using the advertiser keyword purchase history database, a number of keywords purchased by each advertiser of the plurality of advertisers;
generating, via a computer processor, an advertisement history ranking for at least part of the plurality of advertisers, by ranking each advertiser of the at least part of the plurality of advertisers in order based on the calculated number of keywords purchased by each advertiser of the at least part of the plurality of advertisers;
using the generated advertisement history ranking by,
receiving a search query using a first one of the plurality of keywords;
displaying, in a search result page, a plurality of anchor-tags in an order based on the generated advertisement history ranking, wherein the plurality of anchor-tags, when clicked, open keyword linked pages designated by the advertisers of the at least part of the plurality of advertisers, wherein the keyword-linked pages correspond to the first one of the plurality of keywords; and
upon receiving a request for subscribing another keyword advertisement from a first advertiser of the at least part of the plurality of advertisers, formulating a keyword advertisement contract with said first advertiser based on the generated advertisement history ranking.

11. The method of claim 10, wherein using the generated advertisement history ranking further comprises:
obtaining a search result by conducting a search using the received search query;
formulating the search result page, wherein the search result page comprises the search result and the ordered plurality of anchor-tags; and
transmitting the search result page to a user terminal that sent the search query.

12. The method of claim 10, wherein formulating the keyword advertisement contract comprises determining whether to apply a discounted rate for the keyword advertisement contract based on the first advertiser's rank in the generated advertisement history ranking.

13. The method of claim 10, wherein:
at least part of the plurality of keywords are associated with a plurality of categories; and
the method further includes,
identifying a subgroup of the at least part of the plurality of keywords that belong to one category of the plurality of categories; and wherein
the calculated number of keywords purchased by each advertiser is the number of keywords purchased in the subgroup, and
the ranking of each advertiser of the at least part of the plurality of advertisers is based on the number of keywords purchased in the subgroup.

14. The method of claim 10, wherein the at least part of the plurality of advertisers comprises all of the plurality of advertisers.

15. The method of claim 10, wherein the one or more keywords are purchased from a keyword advertisement service and the ranking of each advertiser of the at least part of the plurality of advertisers is further based on the number of keywords that are presently subject to the keyword advertisement service.

16. The method of claim 10, wherein the ranking of each advertiser of the at least part of the plurality of advertisers is further based on a purchase date of the keywords purchased by each advertiser of the at least part of the plurality of advertisers.

17. The method of claim 10, wherein using the generated advertisement history ranking further comprises:
   publishing the generated advertisement history ranking, so that the plurality of advertisers can access the advertisement history ranking.

18. The method of claim 17, wherein the publishing further comprises publishing at least one incentive for higher ranked advertisers of the at least part of the plurality of advertisers.

* * * * *